US010261215B2

(12) United States Patent
Miotti et al.

(10) Patent No.: US 10,261,215 B2
(45) Date of Patent: Apr. 16, 2019

(54) JOINT INVERSION OF GEOPHYSICAL ATTRIBUTES

(71) Applicant: WESTERNGECO L.L.C., Houston, TX (US)

(72) Inventors: Fabio Marco Miotti, Milan (IT); Andrea Lovatini, Peschiera Borromeo (IT); Ivan Guerra, Voghera (IT)

(73) Assignee: WESTERNGECO L.L.C., Houston, TX (US)

( * ) Notice: Subject to any disclaimer, the term of this patent is extended or adjusted under 35 U.S.C. 154(b) by 304 days.

(21) Appl. No.: 14/185,416

(22) Filed: Feb. 20, 2014

(65) Prior Publication Data
US 2014/0297187 A1    Oct. 2, 2014

Related U.S. Application Data

(60) Provisional application No. 61/807,681, filed on Apr. 2, 2013.

(51) Int. Cl.
*G01V 11/00* (2006.01)
(52) U.S. Cl.
CPC .................................. *G01V 11/002* (2013.01)
(58) Field of Classification Search
CPC .. G01V 11/002; G01V 11/00; G01V 2200/00; G01V 2210/00; G01V 2210/41; G01V 2210/58; G01V 2210/586; G01V 2210/588; G01V 2210/61; G01V 2210/616; G01V 2210/6161; G01V 2210/6163; G01V 2210/6169; G01V 2210/62; G01V 2210/622; G01V 2210/6222; G01V 2210/6224; G01V 2210/6226; G01V 2210/624; G01V 2210/6242; G01V 2210/6244; G01V 2210/626; G01V 2210/63; G01V 2210/66; G01V 2210/667
See application file for complete search history.

(56) References Cited

U.S. PATENT DOCUMENTS

| 4,679,174 A | 7/1987 | Gelfand |
| 5,583,825 A | 12/1996 | Carrazzone et al. |
| 6,044,327 A | 3/2000 | Goldman |
| 7,043,367 B2 | 5/2006 | Granjeon |

(Continued)

OTHER PUBLICATIONS

Kwon et al., Uncertainty Analysis for the Integration of Seismic and Controlled Source Electro-Magnetic Data, 2011, Geophysical Prospecting, vol. 59, pp. 609-626.*

(Continued)

*Primary Examiner* — Toan M Le
(74) *Attorney, Agent, or Firm* — Michael Guthrie (57) ABSTRACT

Described herein are implementations of various technologies for a method. The method may receive seismic attributes regarding a region of interest in a subsurface of the earth. The method may receive electrical attributes regarding the region of interest. The method may receive a selection of a rock physics model for the region of interest. The method may calculate values of rock parameters for the selected rock physics model using a nonlinear relation that links cross-properties between the seismic attributes and the electrical attributes for the region of interest. The method may determine the presence of hydrocarbon deposits in the region of interest using the calculated values.

20 Claims, 4 Drawing Sheets

(56) References Cited

U.S. PATENT DOCUMENTS

| | | | |
|---|---|---|---|
| 7,805,250 | B2 | 9/2010 | Colombo et al. |
| 7,840,394 | B2 | 11/2010 | Madatov et al. |
| 8,392,119 | B2 | 3/2013 | Alumbaugh et al. |
| 8,612,194 | B2 | 12/2013 | Horne et al. |
| 8,786,604 | B2 | 7/2014 | Gorell |
| 9,594,483 | B2 | 3/2017 | Gorell |
| 2003/0004648 | A1 | 1/2003 | Huffman et al. |
| 2004/0267454 | A1 | 12/2004 | Granjeon |
| 2008/0015782 | A1 | 1/2008 | Saltzer et al. |
| 2009/0119076 | A1 | 5/2009 | Madatov et al. |
| 2009/0254320 | A1* | 10/2009 | Lovatini ................. G01V 3/12 703/5 |
| 2009/0306899 | A1 | 12/2009 | Harris et al. |
| 2010/0014384 | A1 | 1/2010 | Colombo et al. |
| 2010/0185422 | A1 | 7/2010 | Hoversten |
| 2010/0277177 | A1 | 11/2010 | Alumbaugh et al. |
| 2010/0326669 | A1* | 12/2010 | Zhu ....................... G01V 11/00 166/369 |
| 2011/0108283 | A1 | 5/2011 | Smka et al. |
| 2011/0255371 | A1 | 10/2011 | Jing et al. |
| 2013/0054201 | A1 | 2/2013 | Posamentier et al. |
| 2013/0116927 | A1 | 5/2013 | DiCaprio et al. |
| 2013/0197892 | A1 | 8/2013 | Gorell |
| 2014/0245211 | A1 | 8/2014 | Gorell |
| 2015/0330190 | A1 | 11/2015 | Wu et al. |
| 2015/0362623 | A1 | 12/2015 | Miotti et al. |

OTHER PUBLICATIONS

Fliedner et al., Fast Stochastic Inversion of Marine CSEM and Seismic Data with the Neighbourhood Algorithm, 2011, SEG San Antonio 2011 Annual Meeting, pp. 2517-2522.*
Bachrach, R., "Joint Estimation of Porosity and Saturation Using Stochastic Rock Physics Modeling", Geophysics, vol. 71, No. 5, Sep.-Oct. 2006, 11 pages.
Barclay, et al., "Seismic Inversion: Reading Between the Lines", Oilfield Review, vol. 20, No. 1, 2008, 22 pages.
Carcione, et al., "Cross-property relations between electrical conductivity and the seismic velocity of rocks", Geophysics, vol. 72, No. 5, 2007, 12 pages.
Chen, et al., "Effects of uncertainty in rock-physics models on reservoir parameter estimation using seismic amplitude variation with angle and controlled-source electromagnetics data", Geophysical Prospecting, vol. 57, Issue 1, Jan. 2009, pp. 61-74.
Constable, Steven, "Ten years of marine CSEM for hydrocarbon exploration", Geophysics, vol. 75, No. 5., 2010, 15 pages.
Dell'Aversana, et al., "Joint inversion of rock properties from sonic, resistivity and density well-log measurements", Geophysical Prospecting, Special Issue: Advances in Electromagnetic, Gravity and Magnetic Methods for Exploration, vol. 59, Issue 6, Nov. 2011, pp. 1144-1154.
Gao, et al., "Joint Petrophysical Inversion of Electromagnetic and Full-Waveform Seismic Data", Geophysics, vol. 77, No. 3, 2012, pp. WA3-WA18.
Marion, et al., "Acoustic Properties of Carbonate Rocks: Use in Quantitative Interpretation of Sonic and Seismic Measurements", Carbonate Seismology, 1997, pp. 75-93.
Mehta, et al., "Controlled Source Electromagnetic (CSEM) Technique for Detection and Delineation of Hydrocarbon Reservoirs: an Evaluation", Society of Exploration Geophysicists, SEG Annual Meeting, Houston, Texas, Nov. 6-11, 2005, p. 546.
Miotti, et al., "Estimation of rock properties from seismic, EM and gravity well-log measurements", EGM 2010 International Workshop, Joint Interpretation of Electromagnetic, Gravity, Magnetic and Seismic Data, Apr. 11, 2010, 5 pages.
Tarantola, Albert, "Inverse Problem Theory", Society of Industrial and Applied Mathematics (SIAM), 2005, pp. 68-72.
International Search Report and Written Opinion issued in PCT/US2014/032475 dated Aug. 1, 2014, 15 pages.
EP Appl. No. 14 780 333.2, Examination Report dated Sep. 22, 2016 (6 pages).
Miguel Bosch et al: "Seismic inversion for reservoir properties combining statistical rock physics and geostatistics: A review", Geophysics, Society of Exploration Geophysicists, US, vol. 75, No. 5, Sep. 1, 2010 (Sep. 1, 2010), pp. 75A165-75A176, XP001557880, ISSN: 0016-8033, DOI: 10.1190/1.3478209.
Mezghani, M., Fornel, A.; Langlais, V.; Lucet, N.: "Quantitative Use of 4D Seismic Data for Geological Modeling & Reservoir Characterization Through History Matching", Sep. 29, 2004 (Sep. 29, 2004), pp. 26-29, XP055297255.
Office Action for the equivalent Mexican patent application MX/a/2015/013613 dated Feb. 13, 2018.
Office Action for the equivalent Mexican patent application MX/a/2015/013613 dated Aug. 29, 2017.
Carcione, et al., "A constitutive equation and generalized Gassmann modulus for multimineral porous media," Geophysics, vol. 70, No. 2, Mar.-Apr. 2005, pp. N17-N26.
Search Report for the equivalent European patent application14780333.2 dated Sep. 6, 2016.
Giraud, et al., "Simultaneous Joint Inversion of Electromagnetic and Seismic Full-waveform Data—A Sensitivity Analysis to Biot Parameter," Oral presentation, 75th EAGE Conference & Exhibition incorporating SPE Europec 2013, London, UK Jun. 10-13, 2013.
Hilterman, "Seismic Amplitude Interpretation, Distinguished Instructor Short Course," Distinguished Instructor Series, No. 4, SEG. (pp. Section 7A (7-1); Section 5c (5-10,5-11)), 2001.
International Preliminary Report on Patentability for the equivalent International patent application PCT/US2014/032475 dated Oct. 15, 2015.
International Preliminary Report on Patentability for the cross referenced International patent application PCT/US2015/035510 dated Dec. 15, 2016.
International Search Report and Written Opinion for the cross referenced International patent application PCT/US2015/035510 dated Sep. 1, 2015.
Mavko, et al., "The Rock Physics Handbook: Tools for Seismic Analysis of Porous Media," 2nd Edition. Cambridge University Press. ISBN: 9780521861366, 2009, pp. 273-292 and 428-436.
Miotti, et al., "Petrophysical Joint Inversion of seismic and EM attributes: a case study," SEG Houston 2013 Annual Meeting.
Schön, "Physical Properties of Rocks: Fundamentals and Principles of Petrophysics," Pergamon Press. vol. 18, ISBN 10008044346X, 2004, pp. 406-436, 479-484.).
Communication pursuant to Article 94(3) for the equivalent European patent application14780333.2 dated May 15, 2018.
Chi et al., "Lithology and fluid differentiation using rock physics template", The Leading Edge, pp. 1424-1428 (2009).
Hou et al., MRE-based Bayesian inversion of seismic and EM data for identification of reservoir parameters, SEG Technical Program Expanded Abstracts, 2005, pp. 1437-1440.
Pethick et al., Structural constraints in joint inversion of seismic and EM data: Analysis and visualization, SEG Technical Program Expanded Abstracts, 2014, pp. 1811-1816.
Hou et al., Reservoir-parameter identification using minimum relative entropy-based Bayesian inversion of seismic AVA and marine CSEM data, Geophysics, vol. 71, No. 6, Nov.-Dec. 2006, pp. 077-088.
Chen et al., Special Section—Marine Controlled-Source Electromagnetic Methods, A Bayesian model for gas saturation estimation using marine seismic AVA and CSEM data, Geophysics, vol. 72, No. 2, Mar.-Apr. 2007, pp. WA85-WA95.
Meju et al., Joint multi-geophysical inversion: Effective model integration, challenges and directions for future research, International Workshop on Gravity, Electrical & Magnetic Methods and Their Applications, Beijing, China, Oct. 10-13, 2011 (4 pages).
Buland et al., Bayesian inversion of CSEM and magnetotelluric data, Geophysics, vol. 77, No. 1, Jan.-Feb. 2012, pp. E33-E42.
Chen et al., Joint inversion of marine seismic AVA and CSEM data using statistical rock-physics models and Markov random fields, SEG Houston, 2009 International Exposition and Annual Meeting, pp. 714-718.

(56) References Cited

OTHER PUBLICATIONS

Chen et al., Joint inversion of marine seismic AVA and CSEM data using statistical rock-physics models and Markov random fields, Geophysics, vol. 77, No. 1, Jan.-Feb. 2012, pp. R65-R80.

Nordskag et al., CSEM exploration in the Barents Sea: Joint CSEM & Seismic interpretation, SEG Houston, 2013 Annual Meeting, pp. 810-814.

Zamanian et al., Hierarchical and Variational Bayesian Approaches to Least-Squares Migration, SEG Denver, 2014 Annual Meeting, pp. 3731-3736.

Gunning et al., Resolution and uncertainty in 1D CSEM inversion: A Bayesian approach and open-source implementation, Geophysics, vol. 75, No. 6, Nov.-Dec. 2010, pp. F151-171.

Jardani et al., Stochastic joint inversion of 2D seismic and seismoelectric signals in linear poroelastic materials: A numerical investigation, Geophysics, vol. 75, No. 1, Jan.-Feb. 2010, pp. N19-N31.

Terry et al., Estimating Dielectric Permittivity Variations Using Tomographic GPR Data Through Entropy-Bayesian Inversion Integrated With Efficient Sampling and Pilot Points, SAGEEP 2013, Denver, Colorado, USA (23 pages).

Liang et al., Simultaneous estimation of permeability and porosity from joint inversion of time-lapse seismic, elec-tromagnetic, and production data, SEG Houston, 2013 Annual Meeting, pp. 4991-4997.

Ray et al., Robust and accelerated Bayesian inversion of marine controlled-source electromagnetic data using parallel tempering, Geophysics., vol. 78, No. 6, Nov.-Dec. 2013, pp. E271-280.

Dubreuil-Boisclair et al., Heterogeneous aquifer characterization from ground-penetrating radar tomography and borehole hydrogeophysical data using nonlinear Bayesian simulations, Geophysics, vol. 76, No. 4 (Jul.-Aug. 2011) pp. J13-J25.

Lien et al., Structural joint inversion of AVO and CSEM data using flexible representations, SEG San Antonio 2011 Annual Meeting, pp. 1897-1902.

Communication pursuant to Article 94(3) for the equivalent European patent application 14780333.2 dated Feb. 21, 2019 (5 pages).

\* cited by examiner

JOINT INVERSION OF GEOPHYSICAL ATTRIBUTES

CROSS-REFERENCE TO RELATED APPLICATION

This application claims the benefit of U.S. Provisional Patent Application Ser. No. 61/807,681 filed Apr. 2, 2013, which is incorporated herein by reference in its entirety.

BACKGROUND

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and applicant neither concedes nor acquiesces to the position that any given reference is prior art or analogous prior art.

Seismic exploration may utilize a seismic energy source to generate acoustic signals that propagate into the earth and partially reflect off subsurface seismic reflectors (e.g., interfaces between subsurface layers). The reflected signals are recorded by sensors (e.g., receivers or geophones located in seismic units) laid out in a seismic spread covering a region of the earth's surface. The recorded signals may then be processed to yield a seismic survey.

Besides seismic surveying, electromagnetic surveying has been used for surveying subterranean hydrocarbon reservoirs. For instance, electric field and magnetic field information may be obtained from recorded electromagnetic signals across several frequency channels. The electric field and magnetic information may then be used to obtain resistivity information about the subsurface. An image of the subsurface area may then be generated from the resistivity information.

SUMMARY

In accordance with some embodiments, a method is performed that includes receiving seismic attributes regarding a region of interest in a subsurface of the earth. The method may receive electrical attributes regarding the region of interest. The method may receive a selection of a rock physics model for the region of interest. The method may calculate values of rock parameters for the selected rock physics model using a nonlinear relation that links cross-properties between the seismic attributes and the electrical attributes for the region of interest. The method may determine the presence of hydrocarbon deposits in the region of interest using the calculated values.

In accordance with some embodiments, a method is performed that includes receiving seismic attributes regarding a region of interest in a subsurface of the earth. The method may receive electrical attributes regarding the region of interest. The method may receive a selection of a rock physics model for the region of interest. The method may calculate values of rock parameters for the selected rock physics model using a nonlinear relation that links cross-properties between the seismic attributes and the electrical attributes for the region of interest. The method may determine a petrophysical model for the region of interest using the calculated values.

In accordance with some embodiments, a method is performed that includes receiving physical attributes from a first survey regarding a region of interest. The method may receive physical attributes from a second survey regarding the region of interest. The method may receive a selection of a physics model for the region of interest. The method may calculate values of physical parameters for the selected physics model using a nonlinear relation that links cross-properties between the physical attributes from the first survey and the physical attributes from the second survey. The method may determine a water saturation model or a porosity model for the region of interest using the calculated values.

The above referenced summary section is provided to introduce a selection of concepts that are further described below in the detailed description section. The summary is not intended to identify features of the claimed subject matter, nor is it intended to be used to limit the scope of the claimed subject matter. Furthermore, the claimed subject matter is not limited to implementations that solve any or most disadvantages noted in any part of this disclosure. Indeed, the systems, methods, processing procedures, techniques and workflows disclosed herein may complement or replace conventional methods for identifying, isolating, and/or processing various aspects of seismic signals or other data that is collected from a subsurface region or other multi-dimensional space, including time-lapse seismic data collected in a plurality of surveys.

BRIEF DESCRIPTION OF THE DRAWINGS

Implementations of various technologies will hereafter be described with reference to the accompanying drawings. It should be understood, however, that the accompanying drawings illustrate various implementations described herein and are not meant to limit the scope of various technologies described herein.

DETAILED DESCRIPTION

The discussion below is directed to certain specific implementations. It is to be understood that the discussion below is for the purpose of enabling a person with ordinary skill in the art to make and use any subject matter defined now or later by the patent "claims" found in any issued patent herein.

Reference will now be made in detail to various implementations, examples of which are illustrated in the accompanying drawings and figures. In the following detailed description, numerous specific details are set forth in order to provide a thorough understanding of the claimed invention. However, it will be apparent to one of ordinary skill in the art that the claimed invention may be practiced without these specific details. In other instances, well known methods, procedures, components, circuits, and networks have not been described in detail so as not to unnecessarily obscure aspects of the claimed invention.

It will also be understood that, although the terms first, second, etc. may be used herein to describe various elements, these elements should not be limited by these terms. These terms are used to distinguish one element from another. For example, a first object or block could be termed a second object or block, and, similarly, a second object or block could be termed a first object or block, without departing from the scope of various implementations described herein. The first object or block, and the second object or block, are both objects or blocks, respectively, but they are not to be considered the same object or block.

The terminology used in the description herein is for the purpose of describing particular implementations and is not intended to limit the claimed invention. As used herein, the singular forms "a," "an" and "the" are intended to include the plural forms as well, unless the context clearly indicates otherwise. It will also be understood that the term "and/or" as used herein refers to and encompasses any possible combinations of one or more of the associated listed items. It will be further understood that the terms "includes," "including," "comprises" and/or "comprising," when used in this specification, specify the presence of stated features, integers, blocks, operations, elements, and/or components, but do not preclude the presence or addition of one or more other features, integers, blocks, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various implementations described herein are directed to a method for estimating rock parameters in a region of interest. These implementations will be described in more detail with reference to FIGS. 1-4.

Figure 1:
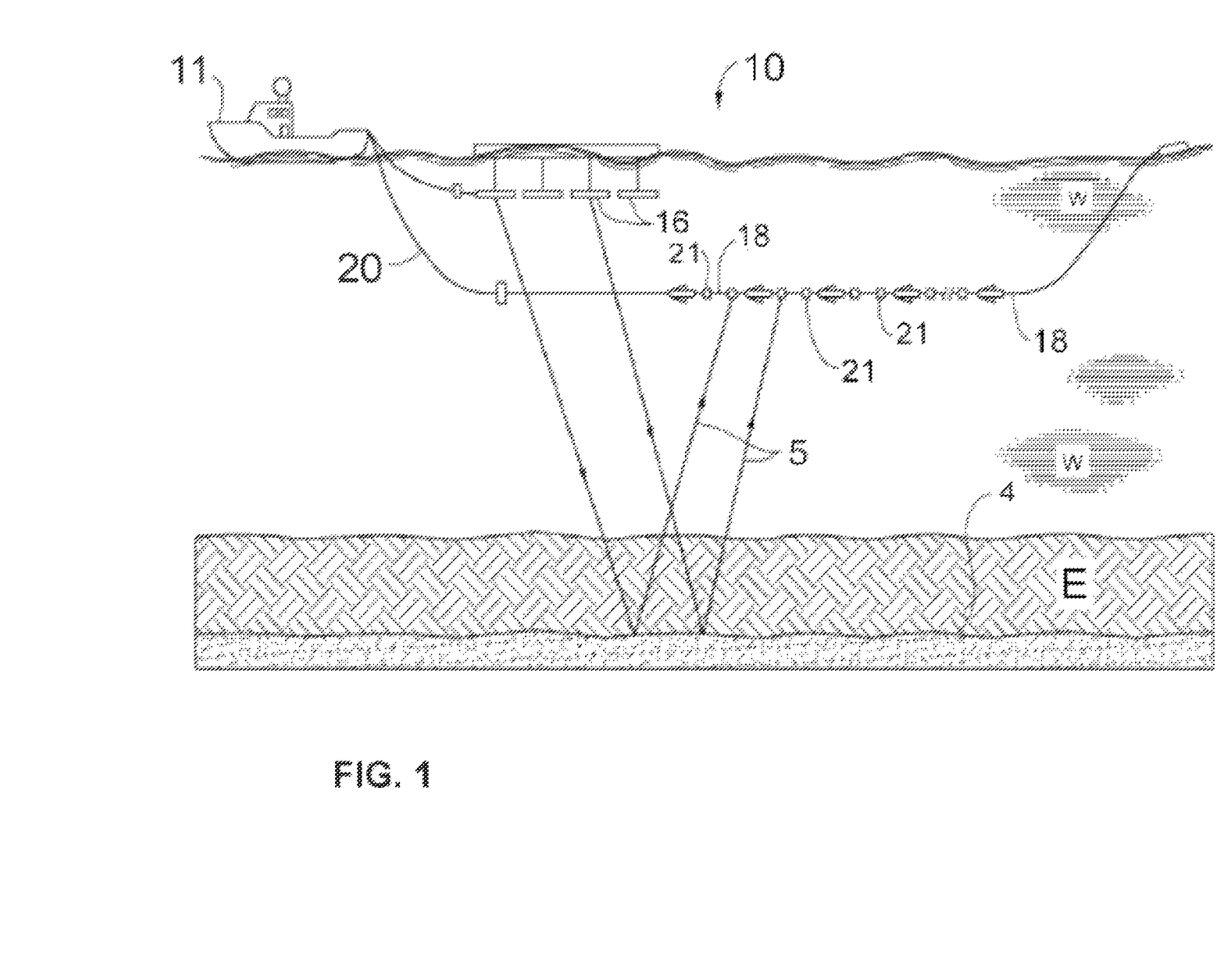
FIG. 1 illustrates a diagrammatic view of marine seismic surveying in accordance with various implementations described herein.

FIG. 1 illustrates a diagrammatic view of marine seismic surveying 10 in accordance with implementations of various techniques described herein. A marine seismic acquisition system 10 may include a vessel 11 carrying control components and towing a plurality of seismic sources 16 and a plurality of streamers 18 equipped with seismic receivers 21. The seismic sources 16 may include a single type of source, or different types. The sources may use any type of seismic generator, such as air guns, water guns, steam injection sources, explosive sources such as dynamite or gas injection followed by detonation and the like. The streamers 18 may be towed by means of their respective lead-ins 20, which may be made from high strength steel or fiber-reinforced cables that convey electrical power, control and data signals between the vessel 11 and the streamers 18. An individual streamer may include a plurality of seismic receivers 21 that may be distributed at spaced intervals along the streamer's length. The seismic receivers 21 may include hydrophone sensors as well as multi-component sensor devices, such as accelerometers. Further, the streamers 18 may include a plurality of inline streamer steering devices (SSDs), also known as "birds." The SSDs may be distributed at appropriate intervals along the streamers 18 for controlling the streamers' depth and lateral movement. A single survey vessel may tow a single receiver array along individual sail lines, or a plurality of survey vessels may tow a plurality of receiver arrays along a corresponding plurality of the sail lines.

During acquisition, the seismic sources 16 and the seismic streamers 18 may be deployed from the vessel 11 and towed slowly to traverse a region of interest. The seismic sources 16 may be periodically activated to emit seismic energy in the form of an acoustic or pressure wave through the water. The sources 16 may be activated individually or substantially simultaneously with other sources. The acoustic wave may result in one or more wavefields that travel coherently into the earth E underlying the water W. As the wavefields strike interfaces 4 between earth formations, or strata, they may be reflected back through the earth E and water W along paths 5 to the various receivers 21 where the wavefields (e.g., pressure waves in the case of air gun sources) may be converted to electrical signals, digitized and transmitted to the integrated computer-based seismic navigation, source controller, and recording system in the vessel 11 via the streamers 18 and lead-ins 20. Through analysis of these detected signals, it may be possible to determine the shape, position and lithology of the sub-sea formations, including those formations that may include hydrocarbon deposits. While a marine seismic survey is described in regard to FIG. 1, a land-based seismic survey may also be used in accordance with implementations of various techniques described herein.

Figure 2:
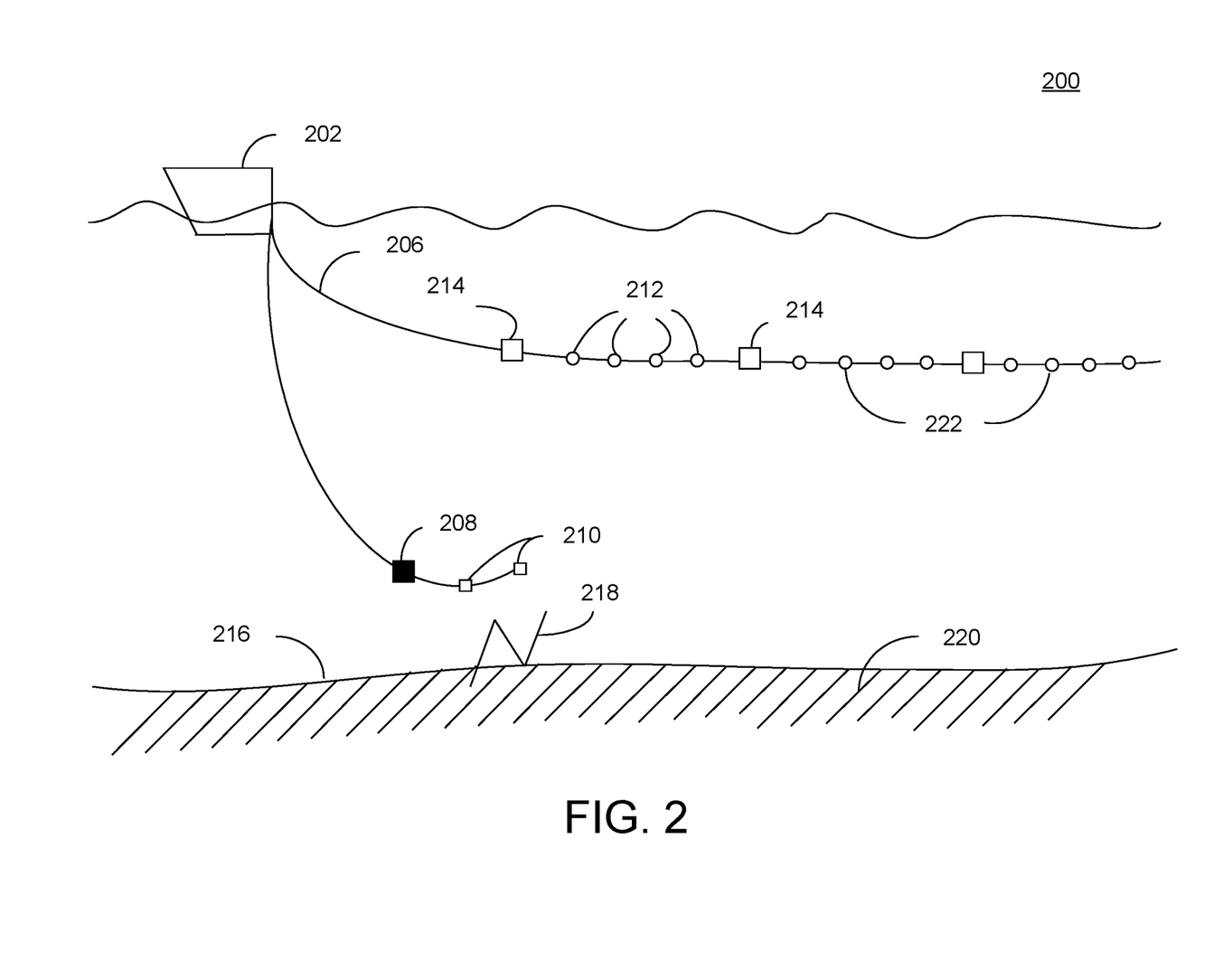
FIG. 2 illustrates an electromagnetic survey system in accordance with various implementations described herein.

FIG. 2 illustrates a marine electromagnetic survey system 200 in accordance with implementations of various technologies described herein. The electromagnetic survey system 200 may use controlled-source electromagnetic (CSEM) survey techniques, but other electromagnetic survey techniques may also be used. Marine electromagnetic surveying may be performed by a survey vessel 202 that moves in a predetermined pattern along the surface of a body of water such as a lake or the ocean. The survey vessel 202 is configured to pull a towfish (an electric source) 208, which is connected to a pair of electrodes 210. During the survey, the vessel may stop and remain stationary for a period of time during transmission.

At the source 208, a controlled electric current may be generated and sent through the electrodes 210 into the seawater. For instance, the electric current generated may be in the range between about 0.01 Hz and about 20 Hz. The current creates an electromagnetic field 218 in the subsurface 220 to be surveyed. The electromagnetic field 218 may also be generated by magneto-telluric currents instead of the source 208. The survey vessel 202 may also be configured to tow a sensor cable 206. The sensor cable 206 may be a marine towed cable. The sensor cable 206 may contain sensor housings 212, telemetry units 214 and current sensor electrodes 222. The sensor housings 212 may contain voltage potential electrodes for measuring the electromagnetic field 218 strength created in the subsurface area 220 during the surveying period. The current sensor electrodes 222 may be used to measure electric field strength in directions transverse to the direction of the sensor cable 206 (the y- and z-directions). The telemetry units 214 may contain circuitry configured to determine the electric field strength using the electric current measurements made by the current sensor electrodes 222. While a marine-based electromagnetic survey is described in regard to FIG. 2, a land-based electromagnetic survey may also be used in accordance with implementations of various techniques described herein.

Figure 3:
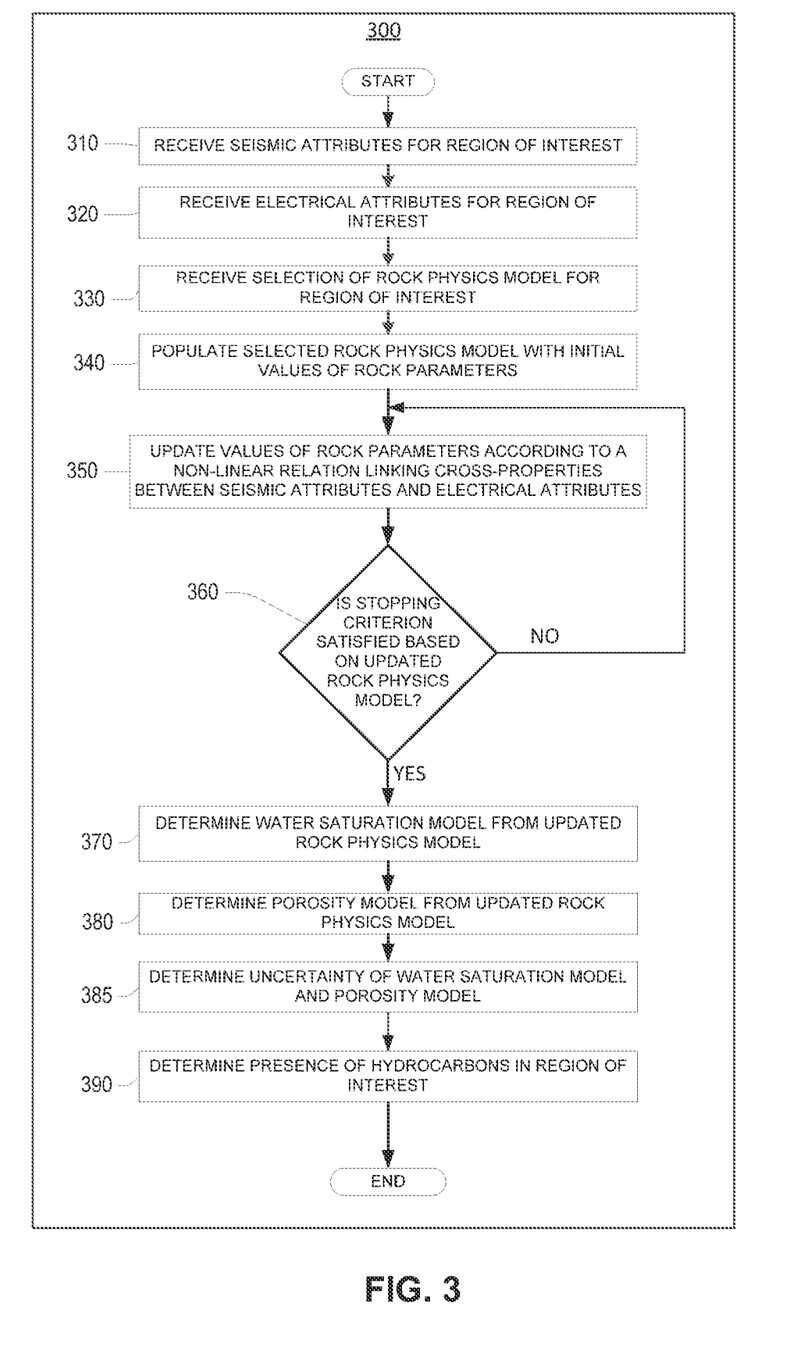
FIG. 3 illustrates a flow diagram of a method for estimating rock parameters in accordance with various implementations described herein.

FIG. 3 illustrates a flow diagram of a method 300 for estimating rock parameters in accordance with various implementations described herein. It should be understood that while the operational flow diagram indicates a particular order of execution of the operations, in other implementations, the operations might be executed in a different order.

Further, in some implementations, additional operations or blocks may be added to the method. Likewise, some operations or blocks may be omitted.

At block 310, seismic attributes for a region of interest are received. Examples of seismic attributes may include acoustic impedance, density, $V_p/V_s$ (i.e., the ratio of a p-wave's velocity to that of the respective s-wave's velocity), Poisson's ratio, s-impedance or other anisotropic parameters of areas in a subsurface of the earth. The region of interest may include an area in the earth's subsurface encompassed by a seismic or other survey. The region of interest may be a physical region that is analyzed to predict reservoir properties, such as oil, gas or water saturation.

The seismic attributes may be obtained from a seismic data set that was acquired using the implementations described in regard to FIG. 1. Further, the seismic attributes may be the product of a transformation process called seismic inversion. In seismic inversion, raw seismic data acquired during a survey may undergo a data interpretation process to obtain geological depth information, such as the seismic attributes for the region of interest. Seismic inversion encompasses many different seismic data processes, which may be done pre-stack or post-stack, deterministically, randomly or using geostatistical methods. The science behind seismic inversion is that a recorded seismic trace may be modeled as the convolution of a wavelet and a reflection coefficient series with noise added in. Equation 1 demonstrates this relationship:

$$S(t)=R(t)*w(t)+n(t) \quad \text{Equation 1}$$

where S(t) is a recorded seismic trace as a function of reflection time, R(t) is the reflection coefficient series, w(t) is the wavelet, n(t) is noise, and * is the convolution operator.

In one implementation, the seismic attributes received in block 310 may be arranged in a model or volume composed of cells that represent physical locations in the region of interest. Individual cells may include specific values for various seismic attributes that correspond to the cell's respective physical location. These individual cells may also include a measure of uncertainty associated with specific seismic attributes for that respective cell. In one case, the measured uncertainty may be the measured standard deviation calculated for the respective seismic attribute.

At block 320, electrical attributes are received for the region of interest. Examples of electrical attributes may include resistivity, conductivity, or other electrical parameters. The electrical attributes may be obtained from raw electromagnetic (EM) data (e.g., electric field data and/or magnetic field data) acquired during an electromagnetic survey. Raw EM data may be collected by recording electromagnetic fields that pass beneath the earth's subsurface. While the raw EM data may be acquired using CSEM survey techniques as described in FIG. 2, other electromagnetic survey techniques may be used as well. For instance, magnetotelluric (MT) surveying or DC electrical techniques, such as those regarding resistivity or magnetometric resistivity, may be used to determine electrical attributes for the region of interest. Through CSEM inversion or a similar type of electromagnetic inversion, the raw EM data may be transformed into a data set that shows electrical attributes such as resistivity, conductivity, or other EM properties of the mediums in the subsurface. This inversion may produce an EM data set that includes separate vertical and horizontal resistivity attributes for the region of interest. If isotropic media is assumed, either the horizontal or vertical resistivity components may be used as the basis for a specific electrical attribute. In one implementation, the electrical attributes may be obtained through a controlled-source electromagnetic anisotropic inversion of electromagnetic survey data for the region of interest.

In one implementation, the electrical attributes received in block 320 may be arranged in a model or volume composed of cells that represent physical locations in the region of interest. Individual cells may include specific values for various electrical attributes that correspond to the cell's respective physical location. These individual cells may also include a measure of uncertainty associated with specific electrical attributes for that respective cell. In one case, the measured uncertainty may be the measured standard deviation calculated for the respective electrical attribute.

At block 330, a selection of a rock physics model for the region of interest is received (i.e., "the selected rock physics model"). Various rock physics models are available and their efficacy may depend on the particular lithology of the sediments in the region of interest. The selected rock physics model may be an isotropic or anisotropic rock physics model, which may encompass anisotropic scenarios. One example of a selected rock physics model may include a forward model based on the Gassmann model and the second formulation of the Archie model. The selected rock physics model may represent constitutive equations that link rock properties with well-log measurements through specific cross properties.

Cross-properties are parameters relating various heterogeneous well-log measurements to each other (e.g., data from a sonic log, a resistivity log, a gravimetric log, etc.), where heterogeneous may refer to measurements obtained through different types of surveying (e.g., measurements obtained through seismic surveying versus electromagnetic surveying). Based on various cross-property relations, specific properties obtained from electrical measurements (i.e., the resistivity log), density measurements (i.e., the gravimetric log) and elastic measurements (i.e., the sonic or seismic log) of physical mediums may overlap. Using these cross-property relations may prove ideal, for instance, when seismic velocity measurements can be more easily collected for a physical region than conductivity measurements for that same region. In that case, the conductivity for the physical region may be obtained from a cross-property relation with the seismic velocity as recorded for that same region. Examples of cross-property parameters may include rock porosity $\phi$, water saturation $S_w$, oil saturation $S_o$ and gas saturation $S_g$.

At block 340, the selected rock physics model may be populated with initial values of rock parameters (i.e., "the populated rock physics model") as used by the selected rock physics model. In calculating values for the selected rock physics model, for instance, realistic starting values may be obtained for both the porosity and water saturation throughout the region of interest. Furthermore, geophysical boundaries of rocks parameters (i.e., the physical regions with particular rock parameter values) that correspond to seismic attributes (from block 310) or to electrical attributes (from block 320) may be determined. The initial values may be determined using various analytical micromechanical methods, such as the Hashin-Shtrikman model. With the Hashin-Shtrikman model, upper or lower bounds may be determined for specific rock parameters, such as those for elastic moduli (e.g., bulk modulus, shear modulus, bulk density, etc.) or tensors. The populated rock model may be referred to as the prior model $m_{prior}$, as used in block 350. The uncertainty of the prior model may be referred to as $C_M$, as used in block 350.

In one implementation, the selected rock physics model may be calibrated to achieve realistic starting values. One method of calibration may include analyzing well logs available for the region of interest. The selected rock physics model may also be calibrated through the analysis of scatter plots that explain specific relations between seismic attributes and electrical attributes (e.g., Poisson's ratio versus resistivity). Further, the calibration may be performed by comparing specific relations between seismic attributes themselves (e.g., acoustic impedance versus Poisson's ratio).

To calculate rock property values (i.e., initial values or updated values) for the selected rock physics model, several specific relations or constitutive equations may be used. Isotropic media may be assumed for the constitutive equations, but this approach may also be used for anisotropic media. For instance, the compressional velocity, $V_p$, in homogeneous, isotropic, elastic media may be predicted using the following equation:

$$V_P = \sqrt{\frac{K_G + \frac{4}{3}\mu}{\rho}} \quad \text{Equation 2}$$

where $\rho$ is the bulk density of a composite medium, $\mu$ is the effective shear modulus of the porous rock, and $K_g$ is the effective bulk modulus of the saturated rock, which may be calculated using the Gassmann model. The Gassmann model is defined by the following equation:

$$K_G = \frac{K_s - K_m + \phi \cdot K_m \cdot \frac{K_s}{K_f} - 1}{1 - \phi - \frac{K_m}{K_s} + \phi \cdot \frac{K_s}{K_f}} \quad \text{Equation 3}$$

where $\phi$ is the total porosity of the medium, $K_s$ is the bulk modulus of mineral content that makes up the rock, $K_f$ is the effective bulk modulus of the fluid phase, and $K_m$ is the effective bulk modulus of dry porous rock predicted by the Krief model. $K_m$ may be defined using the following equation:

$$K_m = K_s \cdot (1-\phi)^{\frac{A}{1-\phi}} \quad \text{Equation 4}$$

A is the empirical parameter with '3' being the most common value of the empirical parameter. The effective bulk modulus of the fluid phase, $K_f$, may be predicted by Wood's formula (three-phase fluid), which is defined in the following equation:

$$K_f = \left(\frac{S_w}{K_w} + \frac{S_g}{K_g} + \frac{S_o}{K_o}\right)^{-1} \quad \text{Equation 5}$$

Returning to Equation 2, the effective shear modulus of porous rock, $\mu$, may be obtained using the Krief model that is defined in the following equation:

$$\mu = \mu_s \cdot (1-\phi)^{\frac{A}{1-\phi}} \quad \text{Equation 6}$$

where $\mu_s$ is the shear modulus of the mineral content that makes up the rock.

To calculate the bulk density of a composite medium, $\rho$, the volumetric average (three-phase fluid) may be used as defined by the following equation:

$$\rho = (1-\phi) \cdot \rho_s + \phi \cdot (S_w \rho_w + S_o \rho_o + S_g \rho_g) \quad \text{Equation 7}$$

In regard to Equation 7, $\rho_s$ is the mean bulk density (also called grain density) of a solid matrix material, $\rho_w$ is the density of water, $\rho_o$ is the density of oil and $\rho_g$ is the density of gas.

To calculate the electrical resistivity, the Archie model's second formulation may be used as defined by the following equation:

$$R = R_w \cdot S_w^{-n} \cdot \phi^{-m} \quad \text{Equation 8}$$

where $R_w$ is the water resistivity, $S_w$ is the water saturation, m is the cementation exponent, and n is the saturation exponent.

Geophysical attributes (e.g., seismic attributes and electrical attributes) and the cross-property parameters may be linked using the rock physics models (i.e., Krief and Gassman models) described above, which results in the following equations:

$$AI_{AVO} = V_P \cdot \rho = \sqrt{\frac{K_G(\phi, Sw) + \frac{4}{3}\mu_m(\phi)}{\rho(\phi, Sw)}} \cdot \rho(\phi, Sw) \quad \text{Equation 9}$$

$$R_{CSEM} = R(\phi, Sw) \quad \text{Equation 10}$$

$AI_{AVO}$ of Equation 9 is the acoustic impedance based on amplitude versus offset (AVO), and $R_{CSEM}$ of Equation 10 is the resistivity determined by CSEM inversion.

The populated rock physics model may have a grid that matches the cells of the seismic attributes and the electrical attributes from blocks 310 and 320, respectively. In one implementation, since CSEM inversion may produce an electromagnetic data set with a resolution that is less than a seismic data set produced by seismic inversion, a transverse resistance principle may mitigate this limitation through a two phase process. First, a resistive anomaly (i.e., $R_{anomaly}$) which results from the CSEM inversion may be defined as: $R_{anomaly} = R_{CSEM} - R_{back}$. In this formulation, $R_{back}$ is a background resistivity model, which may be based on well logs and/or geological information. Secondly, by applying the transverse resistive principle to the $R_{anomaly}$, the resistive anomaly may be bound within the geological boundaries that are supposed to include hydrocarbon.

At block 350, the current rock physics model, $m_k$, is updated according to a non-linear relation that links cross-property parameters between the seismic attributes and the electrical attributes. Where the process reaches block 350 for the first time, the current rock physics model may be the same one as the populated rock physics model from block 340. For instance, the following equation may be used to describe the non-linear relation:

$$d = g(m) \quad \text{Equation 11}$$

In Equation 11, the vector m defines unknown model parameters in the model space $m=[\phi, S_w]^T$ (e.g., porosity and water saturation in a bi-phase configuration, though in other implementations different or additional cross-properties may be used, such as in tri-phase cases), while the d vector represents the geophysical measured attributes or input data such that $d=[AI_{AVO}, R_{CSEM}]^T$ (i.e., acoustic impedance and resistivity). The function g is the nonlinear relation. In accordance with Bayesian theory, the initial values of rock parameters as obtained in block 340 may be described by the prior model $m_{prior}$ (i.e., the populated rock physics model) and by the covariance matrix $C_M$ that takes into account the prior model's uncertainties. The uncertainty associated with the observed data (i.e., the survey data used for the seismic attributes or electrical attributes) is captured by $C_D$, which is a data covariance matrix. A Gaussian probability distribution may be assumed for both the unknown model parameters m and the input data d. The Jacobian matrix $G_k$ may include the derivatives of the selected rock physics model equation with respect to the current values of the unknown model parameters.

Keeping with block 350, the current model $m_k$ may be updated iteratively by calculating new rock parameters values using a solution of the inverse problem to Equation 11. The solution may be obtained through an iterative procedure that linearizes the selected rock physics model (e.g., the Gassman model and Archie model) around the current model $m_k$ to obtain a new model or updated model $m_{k+1}$. The solution may be expressed in the closed-form as defined by the following equation:

$$m_{k+1} = m_{prior} - [G_k^T C_d^{-1} G_k + C_M^{-1}]^{-1} G_k^T C_d^{-1} \cdot [(g(m_k) - d) - G_k(m_k - m_{prior})]$$

Equation 12

With individual iterations of Equation 12, the Jacobian matrix Gk may be updated accordingly to produce the updated model $m_{k+1}$.

At block 360, the updated model from block 350 is compared with a stopping criterion. For instance, the iterative algorithm of block 360 may stop when the following inequality is satisfied:

$$\|m_{i,k+1} - m_{i,k}\| < \varepsilon \forall_i = 1, \ldots, L$$

Equation 13

Where L represents the number of cells in the selected rock physics model and ε is a predetermined value that specifies the stopping criterion. The stopping criterion may be a set of values where the posterior probability density of the selected model is maximized. Further, the stopping criterion may be where the values of the updated rock model $m_{k+1}$ converge to a local optimum. If the stopping criterion has been satisfied, the process may proceed to block 370. If the stopping criterion has not been satisfied, the process may return to block 350.

At block 370, a water saturation model is determined from the updated model produced in block 360. The water saturation model may include the values of $S_w$ obtained for $m_{post}$ (or the final $m_{k+1}$ used in block 360). The water saturation model may have L number of cells, or the same number of cells as used in the selected rock physics model.

At block 380, a porosity model is determined from the updated model produced in block 360. The porosity model may include the values of φ obtained for $m_{post}$. The porosity model may have L number of cells, or the same number of cells as used in the selected rock physics model.

At block 385, an amount of uncertainty regarding the water saturation model and the porosity model is determined or estimated. The estimated uncertainty of the solution of the inverse problem to Equation 11 may be calculated from the posterior covariance matrix of the model $m_{post}$ which is defined in the following equation:

$$C_{M,post} = (G_k^T C_d^{-1} G_k + C_M^{-1})^{-1}$$

Equation 14

The estimated uncertainty of the final parameters of $m_{post}$ may be the measured standard deviation for the respective final rock parameters. The estimated uncertainty may provide a measure of confidence in the accuracy of the final updated model.

At block 390, the presence of hydrocarbons is determined for the region of interest. For instance, a petrophysical model may be estimated for the region of interest. The petrophysical model may be based on the water saturation model from block 370 or the porosity model from block 380. The petrophysical model may include various petrophysical properties that describe the region of interest such as the amount of shale (Vshale), the elastic moduli of composite rock or the density of the solid phase of rock. The elastic moduli of composite rock may include the bulk modulus or the shear modulus of the composite rock. The uncertainty from block 385 may also be used in this hydrocarbon determination or for estimating the petrophysical model. A degree of confidence or uncertainty associated with the presence of hydrocarbons may be calculated as well. An accurate hydrocarbon determination may prevent the drilling of costly unproductive wells.

Typically, the wellbore is drilled according to a drilling plan that is established prior to drilling. The drilling plan typically sets forth equipment, pressures, trajectories and/or other parameters that define the drilling process for the wellsite. The drilling operation may then be performed according to the drilling plan. However, as information is gathered, the drilling operation may need to deviate from the drilling plan. Additionally, as drilling or other operations are performed, the subsurface conditions may change. The earth model may also need adjustment as new information is collected.

Data gathered by sensors may be collected by surface unit and/or other data collection sources for analysis or other processing. The data collected by sensors may be used alone or in combination with other data. The data may be collected in one or more databases and/or transmitted on or offsite. The data may be historical data, real time data, or combinations thereof. The real time data may be used in real time, or stored for later use. The data may also be combined with historical data or other inputs for further analysis. The data may be stored in separate databases, or combined into a single database.

Static and dynamic measurements may be analyzed and used to generate models of the subterranean formation to determine characteristics thereof. Similar measurements may also be used to measure changes in formation aspects over time.

In one implementation, method 300 may be used with input data of physical attributes besides seismic attributes or electrical attributes. Such physical attributes may be obtained from surveys that use sonar, gravimetric, or satellite tomographic imaging. For instance, density attributes may be obtained for a region of interest using a gravimetric survey. Physical attributes from two different survey-types may be used with a non-linear relation similar to the one described in block 350 to update a respective model. A physical parameter model, such as a water saturation model or a porosity model, may then be obtained for the region of interest. The region of interest may also be a region of human tissue, plant tissue, or any other multi-dimension region of interest. A physics model specific to the region of interest may be used instead of a rock physics model.

In accordance with some embodiments, a method is performed that includes receiving seismic attributes regarding a region of interest in a subsurface of the earth. The method may receive electrical attributes regarding the region of interest. The method may receive a selection of a rock physics model for the region of interest. The method may calculate values of rock parameters for the selected rock physics model using a nonlinear relation that links cross-properties between the seismic attributes and the electrical attributes for the region of interest. The method may determine the presence of hydrocarbon deposits in the region of interest using the calculated values.

In one implementation, the seismic attributes may include acoustic impedance, density, Poisson's ratio, s-wave impedance or anisotropic parameters. The seismic attributes may be obtained through seismic inversion of seismic survey data for the region of interest. The electrical attributes may include conductivity or resistivity parameters. The electrical attributes may be obtained through a controlled-source electromagnetic (CSEM) inversion of electromagnetic survey data for the region of interest. The cross-properties may include rock porosity, water saturation, gas saturation or oil saturation. The method may determine a water saturation model for the region of interest using the calculated values. The method may calculate an amount of uncertainty for the water saturation model. The amount of uncertainty of the water saturation model may include the standard deviation of respective cross-property parameters of the calculated values for the selected rock physics model. The method may determine a porosity model for the region of interest using the calculated values for the selected rock physics model. The method may calculate an amount of uncertainty for the porosity model. Calculating values for the selected rock physics model may include iteratively updating the calculated values of the selected rock physics model using the nonlinear relation. The method may determine whether the calculated values for the selected rock physics model have reached a stopping criterion. The stopping criterion may be a predetermined value that maximizes the posterior probability density of the values in the selected rock physics model.

In some implementations, an information processing apparatus for use in a computing system is provided, and includes means for receiving seismic attributes regarding a region of interest in a subsurface of the earth. The information processing apparatus may also have means for receiving electrical attributes regarding the region of interest. The information processing apparatus may also have means for receiving a selection of a rock physics model for the region of interest. The information processing apparatus may also have means for calculating values of rock parameters for the selected rock physics model using a nonlinear relation that links cross-properties between the seismic attributes and the electrical attributes for the region of interest. The information processing apparatus may also have means for determining the presence of hydrocarbon deposits in the region of interest using the calculated values.

In some implementations, a computing system is provided that includes at least one processor, at least one memory, and one or more programs stored in the at least one memory, wherein the programs include instructions, which when executed by the at least one processor cause the computing system to receive seismic attributes regarding a region of interest in a subsurface of the earth. The programs may further include instructions to cause the computing system to receive electrical attributes regarding the region of interest. The programs may further include instructions to cause the computing system to receive a selection of a rock physics model for the region of interest. The programs may further include instructions to cause the computing system to calculate values of rock parameters for the selected rock physics model using a nonlinear relation that links cross-properties between the seismic attributes and the electrical attributes for the region of interest. The programs may further include instructions to cause the computing system to determine the presence of hydrocarbon deposits in the region of interest using the calculated values.

In some implementations, a computer readable storage medium is provided, which has stored therein one or more programs, the one or more programs including instructions, which when executed by a processor, cause the processor to receive seismic attributes regarding a region of interest in a subsurface of the earth. The programs may further include instructions, which cause the processor to receive electrical attributes regarding the region of interest. The programs may further include instructions, which cause the processor to receive a selection of a rock physics model for the region of interest. The programs may further include instructions, which cause the processor to calculate values of rock parameters for the selected rock physics model using a nonlinear relation that links cross-properties between the seismic attributes and the electrical attributes for the region of interest. The programs may further include instructions, which cause the processor to determine the presence of hydrocarbon deposits in the region of interest using the calculated values.

In accordance with some embodiments, a method is performed that includes receiving seismic attributes regarding a region of interest in a subsurface of the earth. The method may receive electrical attributes regarding the region of interest. The method may receive a selection of a rock physics model for the region of interest. The method may calculate values of rock parameters for the selected rock physics model using a nonlinear relation that links cross-properties between the seismic attributes and the electrical attributes for the region of interest. The method may determine a petrophysical model for the region of interest using the calculated values.

In one implementation, the petrophysical model may include the amount of shale, the elastic moduli of composite rock or the density of the solid phase of rock for the region of interest. Calculating values for the selected rock physics model may include updating iteratively the calculated values for the selected rock physics model using the nonlinear relation. The method may determine whether the calculated values have reached a stopping criterion.

In some implementations, an information processing apparatus for use in a computing system is provided, and includes means for receiving seismic attributes regarding a region of interest in a subsurface of the earth. The information processing apparatus may also have means for receiving electrical attributes regarding the region of interest. The information processing apparatus may also have means for receiving a selection of a rock physics model for the region of interest. The information processing apparatus may also have means for calculating values of rock parameters for the selected rock physics model using a nonlinear relation that links cross-properties between the seismic attributes and the electrical attributes for the region of interest. The information processing apparatus may also have means for determining a petrophysical model for the region of interest using the calculated values.

In some implementations, a computing system is provided that includes at least one processor, at least one memory, and one or more programs stored in the at least one memory, wherein the programs include instructions, which when executed by the at least one processor cause the computing system to receive seismic attributes regarding a region of interest in a subsurface of the earth. The programs may further include instructions to cause the computing system to receive electrical attributes regarding the region of interest. The programs may further include instructions to cause the computing system to receive a selection of a rock physics model for the region of interest. The programs may further include instructions to cause the computing system to calculate values of rock parameters for the selected rock physics model using a nonlinear relation that links cross-properties between the seismic attributes and the electrical attributes for the region of interest. The programs may further include instructions to cause the computing system to determine a petrophysical model for the region of interest using the calculated values.

In some implementations, a computer readable storage medium is provided, which has stored therein one or more programs, the one or more programs including instructions, which when executed by a processor, cause the processor to receive seismic attributes regarding a region of interest in a subsurface of the earth. The programs may further include instructions, which cause the processor to receive electrical attributes regarding the region of interest. The programs may further include instructions, which cause the processor to receive a selection of a rock physics model for the region of interest. The programs may further include instructions, which cause the processor to calculate values of rock parameters for the selected rock physics model using a nonlinear relation that links cross-properties between the seismic attributes and the electrical attributes for the region of interest. The programs may further include instructions, which cause the processor to determine a petrophysical model for the region of interest using the calculated values.

In accordance with some embodiments, a method is performed that includes receiving physical attributes from a first survey regarding a region of interest. The method may receive physical attributes from a second survey regarding the region of interest. The method may receive a selection of a physics model for the region of interest. The method may calculate values of physical parameters for the selected physics model using a nonlinear relation that links cross-properties between the physical attributes from the first survey and the physical attributes from the second survey. The method may determine a water saturation model or a porosity model for the region of interest using the calculated values.

In another implementation, the physical attributes from the first survey or the second survey may include density attributes.

In some implementations, an information processing apparatus for use in a computing system is provided, and includes means for receiving physical attributes from a first survey regarding a region of interest. The information processing apparatus may also have means for receiving physical attributes from a second survey regarding the region of interest. The information processing apparatus may also have means for receiving a selection of a physics model for the region of interest. The information processing apparatus may also have means for calculating values of physical parameters for the selected physics model using a nonlinear relation that links cross-properties between the physical attributes from the first survey and the physical attributes from the second survey. The information processing apparatus may also have means for determining a water saturation model or a porosity model for the region of interest using the calculated values.

In some implementations, a computing system is provided that includes at least one processor, at least one memory, and one or more programs stored in the at least one memory, wherein the programs include instructions, which when executed by the at least one processor cause the computing system to receive physical attributes from a first survey regarding a region of interest. The programs may further include instructions to cause the computing system to receive physical attributes from a second survey regarding the region of interest. The programs may further include instructions to cause the computing system to receive a selection of a physics model for the region of interest. The programs may further include instructions to cause the computing system to calculate values of physical parameters for the selected physics model using a nonlinear relation that links cross-properties between the physical attributes from the first survey and the physical attributes from the second survey. The programs may further include instructions to cause the computing system to determine a water saturation model or a porosity model for the region of interest using the calculated values.

In some implementations, a computer readable storage medium is provided, which has stored therein one or more programs, the one or more programs including instructions, which when executed by a processor, cause the processor to receive physical attributes from a first survey regarding a region of interest. The programs may further include instructions, which cause the processor to receive physical attributes from a second survey regarding the region of interest. The programs may further include instructions, which cause the processor to receive a selection of a physics model for the region of interest. The programs may further include instructions, which cause the processor to calculate values of physical parameters for the selected physics model using a nonlinear relation that links cross-properties between the physical attributes from the first survey and the physical attributes from the second survey. The programs may further include instructions, which cause the processor to determine a water saturation model or a porosity model for the region of interest using the calculated values.

In some implementations, a multi-dimensional region of interest is selected from the group consisting of a subterranean region, human tissue, plant tissue, animal tissue, volumes of water, volumes of air and volumes of space near and/or outside the atmosphere of a planet, asteroid, comet, moon, or other body. Further, the multi-dimensional region of interest may include one or more volume types selected from the group consisting of a subterranean region, human tissue, plant tissue, animal tissue, volumes of water, volumes of air, and volumes of space near and/or or outside the atmosphere of a planet, asteroid, comet, moon, or other body. This multi-dimensional region of interest may be used as the region of interest in method 300.

Computing System

Implementations of various technologies described herein may be operational with numerous general purpose or special purpose computing system environments or configurations. Examples of well known computing systems, environments, and/or configurations that may be suitable for use with the various technologies described herein include, but are not limited to, personal computers, server computers, hand-held or laptop devices, multiprocessor systems, microprocessor-based systems, set top boxes, programmable consumer electronics, network PCs, minicomputers, mainframe computers, smartphones, smartwatches, personal wearable computing systems networked with other computing systems, tablet computers, and distributed computing environments that include any of the above systems or devices, and the like.

The various technologies described herein may be implemented in the general context of computer-executable instructions, such as program modules, being executed by a computer. Generally, program modules include routines, programs, objects, components, data structures, etc. that performs particular tasks or implement particular abstract data types. While program modules may execute on a single computing system, it should be appreciated that, in some implementations, program modules may be implemented on separate computing systems or devices adapted to communicate with one another. A program module may also be some combination of hardware and software where particular tasks performed by the program module may be done either through hardware, software, or both.

The various technologies described herein may also be implemented in distributed computing environments where tasks are performed by remote processing devices that are linked through a communications network, e.g., by hardwired links, wireless links, or combinations thereof. The distributed computing environments may span multiple continents and multiple vessels, ships or boats. In a distributed computing environment, program modules may be located in both local and remote computer storage media including memory storage devices.

Figure 4:
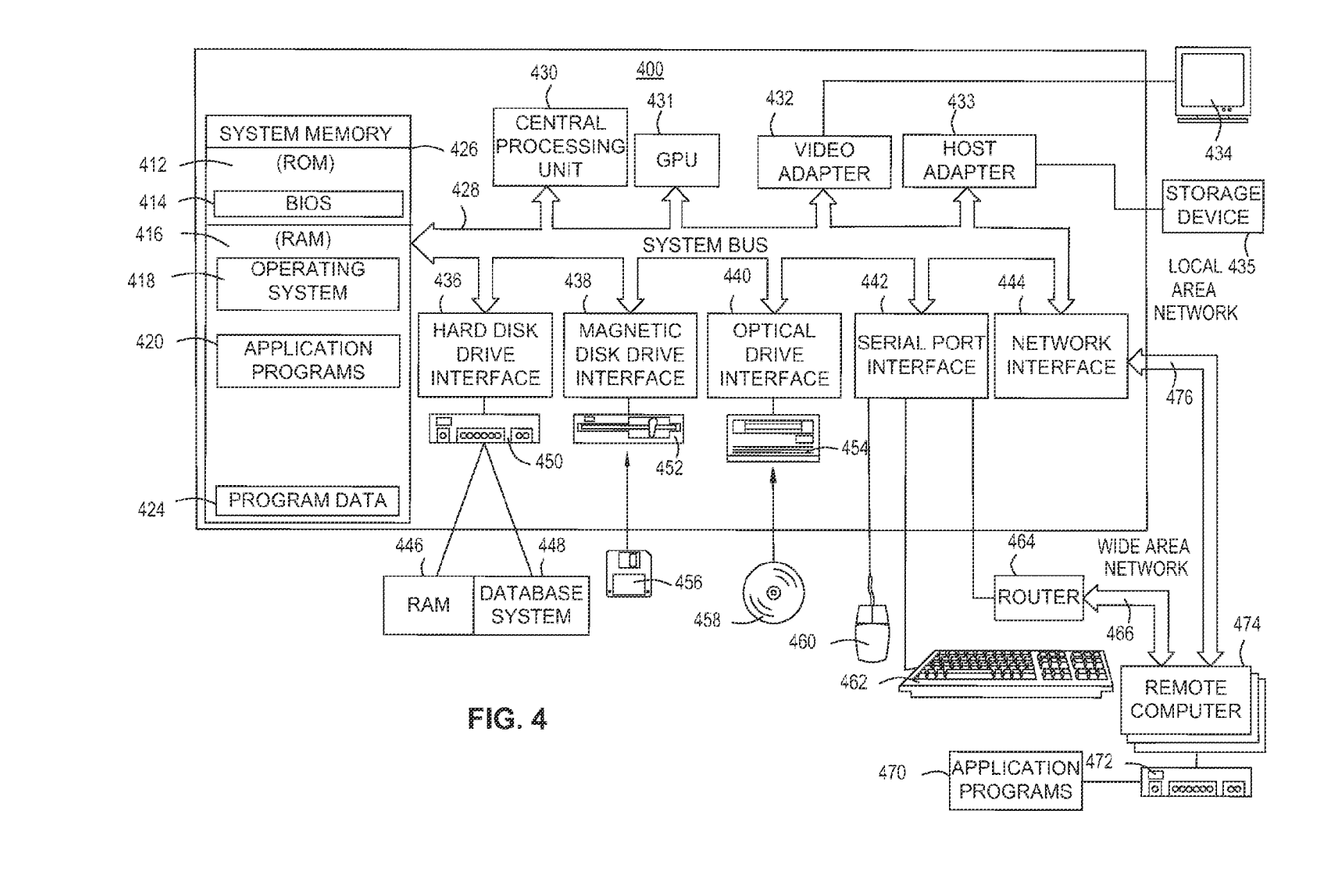
FIG. 4 illustrates a computer system in which the various technologies and techniques described herein may be incorporated and practiced.

FIG. 4 illustrates a schematic diagram of a computing system 400 in which the various technologies described herein may be incorporated and practiced. Although the computing system 400 may be a conventional desktop or a server computer, as described above, other computer system configurations may be used.

The computing system 400 may include a central processing unit (CPU) 430, a system memory 426, a graphics processing unit (GPU) 431 and a system bus 428 that couples various system components including the system memory 426 to the CPU 430. Although one CPU is illustrated in FIG. 4, it should be understood that in some implementations the computing system 400 may include more than one CPU. The GPU 431 may be a microprocessor specifically designed to manipulate and implement computer graphics. The CPU 430 may offload work to the GPU 431. The GPU 431 may have its own graphics memory, and/or may have access to a portion of the system memory 426. As with the CPU 430, the GPU 431 may include one or more processing units, and the processing units may include one or more cores. The system bus 428 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. The system memory 426 may include a read-only memory (ROM) 412 and a random access memory (RAM) 446. A basic input/output system (BIOS) 414, containing the basic routines that help transfer information between elements within the computing system 400, such as during start-up, may be stored in the ROM 412.

The computing system 400 may further include a hard disk drive 450 for reading from and writing to a hard disk, a magnetic disk drive 452 for reading from and writing to a removable magnetic disk 456, and an optical disk drive 454 for reading from and writing to a removable optical disk 458, such as a CD ROM or other optical media. The hard disk drive 450, the magnetic disk drive 452, and the optical disk drive 454 may be connected to the system bus 428 by a hard disk drive interface 456, a magnetic disk drive interface 458, and an optical drive interface 450, respectively. The drives and their associated computer-readable media may provide nonvolatile storage of computer-readable instructions, data structures, program modules and other data for the computing system 400.

Although the computing system 400 is described herein as having a hard disk, a removable magnetic disk 456 and a removable optical disk 458, it should be appreciated by those skilled in the art that the computing system 400 may also include other types of computer-readable media that may be accessed by a computer. For example, such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400. Communication media may embody computer readable instructions, data structures, program modules or other data in a modulated data signal, such as a carrier wave or other transport mechanism and may include any information delivery media. The term "modulated data signal" may mean a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The computing system 400 may also include a host adapter 433 that connects to a storage device 435 via a small computer system interface (SCSI) bus, a Fiber Channel bus, an eSATA bus or using any other applicable computer bus interface. Combinations of any of the above may also be included within the scope of computer readable media.

A number of program modules may be stored on the hard disk 450, magnetic disk 456, optical disk 458, ROM 412 or RAM 416, including an operating system 418, one or more application programs 420, program data 424 and a database system 448. The application programs 420 may include various mobile applications ("apps") and other applications configured to perform various methods and techniques described herein. The operating system 418 may be any suitable operating system that may control the operation of a networked personal or server computer, such as Windows® XP, Mac OS® X, Unix-variants (e.g., Linux® and BSD®), and the like.

A user may enter commands and information into the computing system 400 through input devices such as a keyboard 462 and pointing device 460. Other input devices may include a microphone, joystick, game pad, satellite dish, scanner or the like. These and other input devices may be connected to the CPU 430 through a serial port interface 442 coupled to system bus 428, but may be connected by other interfaces, such as a parallel port, game port or a universal serial bus (USB). A monitor 434 or other type of display device may also be connected to system bus 428 via an interface, such as a video adapter 432. In addition to the monitor 434, the computing system 400 may further include other peripheral output devices such as speakers and printers.

Further, the computing system 400 may operate in a networked environment using logical connections to one or more remote computers 474. The logical connections may be any connection that is commonplace in offices, enterprise-wide computer networks, intranets, and the Internet, such as local area network (LAN) 476 and a wide area network (WAN) 466. The remote computers 474 may be another a computer, a server computer, a router, a network PC, a peer device or other common network node, and may include many of the elements describes above relative to the computing system 400. The remote computers 474 may also each include application programs 470 similar to that of the computer action function.

When using a LAN networking environment, the computing system 400 may be connected to the local network 476 through a network interface or adapter 444. When used in a WAN networking environment, the computing system 400 may include a router 464, wireless router or other means for establishing communication over a wide area network 466, such as the Internet. The router 464, which may be internal or external, may be connected to the system bus 428 via the serial port interface 442. In a networked environment, program modules depicted relative to the computing system 400, or portions thereof, may be stored in a remote memory storage device 435. It will be appreciated that the network connections shown are merely examples and other means of establishing a communications link between the computers may be used.

The network interface 444 may also utilize remote access technologies (e.g., Remote Access Service (RAS), Virtual Private Networking (VPN), Secure Socket Layer (SSL), Layer 2 Tunneling (L2T), or any other suitable protocol). These remote access technologies may be implemented in connection with the remote computers 474.

It should be understood that the various technologies described herein may be implemented in connection with hardware, software or a combination of both. Thus, various technologies, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the various technologies. In the case of program code execution on programmable computers, the computing device may include a processor, a storage medium readable by the processor (including volatile and non-volatile memory and/or storage elements), at least one input device, and at least one output device. One or more programs that may implement or utilize the various technologies described herein may use an application programming interface (API), reusable controls and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations. Also, the program code may execute entirely on a user's computing device, partly on the user's computing device, as a stand-alone software package, partly on the user's computer and partly on a remote computer or entirely on the remote computer or a server computer.

Those with skill in the art will appreciate that any of the listed architectures, features or standards discussed above with respect to the example computing system 400 may be omitted for use with a computing system used in accordance with the various embodiments disclosed herein because technology and standards continue to evolve over time.

Of course, many processing techniques for collected data, including one or more of the techniques and methods disclosed herein, may also be used successfully with collected data types other than seismic data. While certain implementations have been disclosed in the context of seismic data collection and processing, those with skill in the art will recognize that one or more of the methods, techniques, and computing systems disclosed herein can be applied in many fields and contexts where data involving structures arrayed in a three-dimensional space and/or subsurface region of interest may be collected and processed, e.g., medical imaging techniques such as tomography, ultrasound, MRI and the like for human tissue; radar, sonar, and LIDAR imaging techniques; and other appropriate three-dimensional imaging problems.

Although the subject matter has been described in language specific to structural features and/or methodological acts, it is to be understood that the subject matter defined in the appended claims is not limited to the specific features or acts described above. Rather, the specific features and acts described above are disclosed as example forms of implementing the claims.

While the foregoing is directed to implementations of various technologies described herein, other and further implementations may be devised without departing from the basic scope thereof. Although the subject matter has been described in language specific to structural features and/or methodological acts, it is to be understood that the subject matter defined in the appended claims is limited to the specific features or acts described above. Rather, the specific features and acts described above are disclosed as example forms of implementing the claims.

What is claimed is:

1. A method, comprising:
via an interface of a computing system, receiving seismic data as acquired by seismic receivers for a region of interest in a subsurface of the earth and receiving electromagnetic data as acquired by sensor electrodes for the region of interest wherein at least a portion of the seismic data or at least a portion of the electromagnetic data is received during one or more drilling operations;
via the computing system, obtaining seismic attributes through an inversion of the seismic data and separately obtaining electrical attributes through an inversion of the electromagnetic data;
receiving a selection of an isotropic or anisotropic rock physics model for the region of interest, wherein the region of interest is represented by multi-dimensional cells;
calculating, via at least one processor of the computing system, values of rock parameters for the selected rock physics model, individually for each of a plurality of the multi-dimensional cells, at least in part by iteratively solving a closed-form equation that linearizes a nonlinear relation that links cross-properties between the seismic attributes and the electrical attributes for the region of interest and that estimates variance of the rock parameters based at least in part on a covariance matrix of the attributes and a covariance matrix of the rock physics model;

determining the position of hydrocarbon deposits in the region of interest in the subsurface of the earth using the calculated values of at least a portion of the plurality of the multi-dimensional cells; and performing a drilling operation based on the position of hydrocarbon deposits.

2. The method of claim 1, wherein the seismic attributes comprise acoustic impedance, density, Poisson's ratio, s-wave impedance or anisotropic parameters.

3. The method of claim 1, wherein the seismic data comprise seismic survey data for the region of interest.

4. The method of claim 1, wherein the electrical attributes comprise conductivity or resistivity parameters.

5. The method of claim 1, wherein the electrical attributes are obtained through a controlled-source electromagnetic (CSEM) anisotropic inversion of electromagnetic survey data for the region of interest.

6. The method of claim 1, wherein the cross-properties comprise rock porosity, water saturation, gas saturation or oil saturation.

7. The method of claim 1, further comprising determining a water saturation model for the region of interest using the calculated values.

8. The method of claim 7, further comprising calculating an amount of uncertainty for the water saturation model.

9. The method of claim 8, wherein the amount of uncertainty of the water saturation model comprises the standard deviation of respective cross-property parameters of the calculated values.

10. The method of claim 1, further comprising determining a porosity model for the region of interest using the calculated values.

11. The method of claim 10, further comprising calculating an amount of uncertainty for the porosity model.

12. The method of claim 1, wherein calculating the values for the selected rock physics model comprises iteratively updating the calculated values of the selected rock physics model.

13. The method of claim 1, further comprising determining whether the calculated values have reached a stopping criterion.

14. The method of claim 13, wherein the stopping criterion is a predetermined value that maximizes the posterior probability density of the values in the selected rock physics model.

15. A method, comprising:
via an interface of a computing system, receiving seismic data as acquired by seismic receivers for a region of interest in a subsurface of the earth and receiving electromagnetic data as acquired by sensor electrodes for the region of interest wherein at least a portion of the seismic data or at least a portion of the electromagnetic data is received during one or more drilling operations;

via the computing system, obtaining seismic attributes through an inversion of the seismic data and separately obtaining electrical attributes through an inversion of the electromagnetic data;

receiving a selection of a rock physics model for the region of interest, wherein the region of interest is represented by multi-dimensional cells;

calculating, via at least one processor of the computing system, values of rock parameters for the selected rock physics model, individually for each of a plurality of the multi-dimensional cells, at least in part by iteratively solving a closed-form equation that linearizes a nonlinear relation that links cross-properties between the seismic attributes and the electrical attributes for the region of interest and that estimates variance of the rock parameters based at least in part on a covariance matrix of the attributes and a covariance matrix of the rock physics model;

determining a petrophysical model for the region of interest in the subsurface of the earth using the calculated values of at least a portion of the plurality of the multi-dimensional cells; and performing a drilling operation based on the petrophysical model.

16. The method of claim 15, wherein the petrophysical model comprises the amount of shale, the elastic moduli of composite rock, or the density of the solid phase of rock for the region of interest.

17. The method of claim 15, wherein calculating the values for the selected rock physics model comprises updating iteratively the calculated values for the selected rock physics model.

18. The method of claim 15, further comprising determining whether the calculated values have reached a stopping criterion.

19. A method, comprising:
via an interface of a computing system, receiving data of a first survey as acquired by sensors for a region of interest in a subsurface of the earth and receiving data of a second survey as acquired by sensors for the region of interest wherein at least a portion of the data of the first survey or at least a portion of the data of the second survey is received during one or more drilling operations;

via the computing system, obtaining physical attributes through an inversion of the data of the first survey and separately obtaining different physical attributes through an inversion of the data of the second survey;

receiving a selection of a physics model for the region of interest, wherein the region of interest is represented by multi-dimensional cells;

calculating, via at least one processor of the computing system, values of physical parameters for the selected physics model, individually for each of a plurality of the multi-dimensional cells, at least in part by iteratively solving a closed-form equation that linearizes a nonlinear relation that links cross-properties between the physical attributes from the first survey and the physical attributes from the second survey and that estimates variance of the physical parameters based at least in part on a covariance matrix of the attributes and a covariance matrix of the physics model;

determining a water saturation model or a porosity model for the region of interest of the physical space using the calculated values of at least a portion of the plurality of the multi-dimensional cells; and performing a drilling operation based on the water saturation model or the porosity model.

20. The method of claim 19, wherein the physical attributes from the first survey or the second survey are density attributes.

* * * * *